United States Patent
Gil et al.

(10) Patent No.: US 11,003,999 B1
(45) Date of Patent: May 11, 2021

(54) CUSTOMIZED AUTOMATED ACCOUNT OPENING DECISIONING USING MACHINE LEARNING

(71) Applicant: Bottomline Technologies (de) Inc., Portsmouth, NH (US)

(72) Inventors: Leonardo Gil, Manchester, NH (US); Peter Cousins, Rye, NH (US); Alexey Skosyrskiy, Providence, RI (US)

(73) Assignee: Bottomline Technologies, Inc., Portsmouth, NH (US)

( * ) Notice: Subject to any disclaimer, the term of this patent is extended or adjusted under 35 U.S.C. 154(b) by 0 days.

(21) Appl. No.: 16/507,735

(22) Filed: Jul. 10, 2019

Related U.S. Application Data

(63) Continuation-in-part of application No. 16/185,718, filed on Nov. 9, 2018.

(51) Int. Cl.
| | |
|---|---|
| *G06N 5/00* | (2006.01) |
| *G06Q 40/02* | (2012.01) |
| *G06N 20/00* | (2019.01) |
| *G06N 5/02* | (2006.01) |

(52) U.S. Cl.
CPC ............. *G06N 5/025* (2013.01); *G06N 20/00* (2019.01); *G06Q 40/025* (2013.01)

(58) Field of Classification Search
CPC ....... G06N 5/025; G06N 20/00; G06Q 40/025
See application file for complete search history.

(56) References Cited

U.S. PATENT DOCUMENTS

| | | | |
|---|---|---|---|
| 5,970,482 A | 10/1999 | Pham et al. | |
| 6,523,016 B1 | 2/2003 | Michalski | |
| 6,675,164 B2 | 1/2004 | Kamath et al. | |
| 6,687,693 B2 | 2/2004 | Cereghini et al. | |
| 6,708,163 B1 | 3/2004 | Kargupta et al. | |
| 7,092,941 B1 | 8/2006 | Campos | |
| 7,308,436 B2 | 12/2007 | Bala et al. | |
| 8,229,875 B2 | 7/2012 | Roychowdhury | |
| 8,229,876 B2 | 7/2012 | Roychowdhury | |
| 8,776,213 B2 | 7/2014 | McLaughlin | |
| 9,489,627 B2 | 11/2016 | Bala | |
| 9,537,848 B2 | 1/2017 | McLaughlin | |
| 9,667,609 B2 | 5/2017 | McLaughlin | |
| 10,924,514 B1 * | 2/2021 | Altman | G06F 21/6245 |

(Continued)

FOREIGN PATENT DOCUMENTS

WO    WO-2020068784 A1 *   4/2020   ............... G06N 3/08

OTHER PUBLICATIONS

Khalid, "Machine Learning Algorithms 101", Feb. 17, 2018 https://towardsml.com/2018/02/17/machine-learning-algorithms-101/ (Year: 2018).*

(Continued)

*Primary Examiner* — Li B. Zhen
*Assistant Examiner* — Selene A. Haedi
(74) *Attorney, Agent, or Firm* — Richard A. Baker, Jr.

(57) ABSTRACT

A method for using machine learning techniques to analyze past decisions made by administrators concerning account opening requests and to recommend whether an account opening request should be allowed or denied. Further, the machine learning techniques determine various other products that the customer may be interested in and prioritizes the choices of options that the machine learning algorithm determines appropriate for the customer.

20 Claims, 9 Drawing Sheets

(56) References Cited

U.S. PATENT DOCUMENTS

| | | |
|---|---|---|
| 2002/0194159 A1 | 12/2002 | Kamath et al. |
| 2003/0041042 A1 | 2/2003 | Cohen et al. |
| 2003/0093366 A1* | 5/2003 | Halper .................. G06Q 40/02 |
| | | 705/38 |
| 2003/0212629 A1* | 11/2003 | King ........................ G07F 7/08 |
| | | 705/39 |
| 2003/0233305 A1 | 12/2003 | Solomon |
| 2004/0034666 A1 | 2/2004 | Chen |
| 2005/0154692 A1 | 1/2005 | Jacobsen et al. |
| 2006/0101048 A1 | 5/2006 | Mazzagatti et al. |
| 2006/0190310 A1 | 8/2006 | Gudia et al. |
| 2008/0104007 A1 | 3/2008 | Bala |
| 2008/0091600 A1* | 4/2008 | Egnatios ................ G06Q 20/10 |
| | | 705/42 |
| 2009/0307176 A1 | 12/2009 | Jeong et al. |
| 2010/0066540 A1 | 3/2010 | Theobald et al. |
| 2012/0041683 A1 | 2/2012 | Vaske et al. |
| 2013/0071816 A1 | 3/2013 | Singh et al. |
| 2013/0231974 A1 | 9/2013 | Harris et al. |
| 2014/0143186 A1* | 5/2014 | Bala ...................... G06N 5/025 |
| | | 706/12 |
| 2016/0232546 A1* | 8/2016 | Ranft ................ G06Q 30/0206 |
| 2019/0205977 A1* | 7/2019 | Way ...................... G06N 5/003 |

OTHER PUBLICATIONS

U.S. Appl. No. 62/735,568, filed Sep. 2018, Nader et. al.*
"Distributed Mining of Classification Rules", by Cho and Wuthrich, 2002 http://www.springerlink.com/(21nnasudlakyzciv54i5kxz0)/app/home/contribution.asp?referrer=parent&backto=issue,1,6;journal,2,3,31;linkingpublicationresults,1:105441,1.
Bansal, Nikhil, Avrim Blum, and Shuchi Chawla. "Correlation clustering." Machine Learning 56.1-3 (2004): 89-113.
Finley, Thomas, and Thorsten Joachims. "Supervised clustering with support vector machines." Proceedings of the 22nd international conference on Machine learning, ACM, 2005.
Meia et al., Comparing clusterings—an information based distance, Journal of Multivariate Analysis 98 (2007) 873-895.
Khalid, Samia, "Machine Learning Algorithms 101", Feb. 17, 2018, web page found at https://towardsml.com/2018/02/17/machine-learning-algorithms-101/, downloaded on Jul. 7, 2020.

* cited by examiner ized automated account opening decisioning using machine learning

PRIOR APPLICATIONS

This application is a continuation in part application that claims priority to U.S. patent application Ser. No. 16/185,718, filed on Nov. 9, 2018 by the inventors, entitled "Method and System for Automated Account Opening Decisioning", said application incorporated herein by reference. This document draws material from U.S. Pat. No. 9,489,627 and U.S. patent application Ser. No. 16/355,985, each patent and application is incorporated herein by reference.

BACKGROUND

Technical Field

The present disclosure relates generally to machine learning techniques and, more particularly, to using machine learning algorithm to configure account opening decisions and interfaces.

Description of the Related Art

The online channel is increasingly becoming the most important tool available to financial institutions for the acquisition of new, profitable customers. As a result, online account opening and funding solutions can help financial institutions cost-effectively scale customer acquisition, improve customer experience and increase account open and funded rates. When opening a new account or adding services to an account, the account opening software often end up without the ability of the software to determine whether to allow the account to open. Failures to make an automatic determination may be initiated when a user fails to answer questions accurately or completely when setting up an account or when a risk provider identifies the account opener as risky (e.g., potentially fraudulent). Enhancements to the account opening software are needed to determine if the account opening request should be allowed or rejected.

Furthermore, in most account opening processes, the forms and software are static, asking the same questions of every account opening request. There is a need to improve existing account opening software by customizing the options offered and the suggestions for additional banking products.

BRIEF SUMMARY OF THE INVENTION

The present disclosures provides a method for using machine learning techniques to analyze past decisions (made by administrators concerning account opening requests) and to recommend whether an account opening request should be allowed or denied.

Currently, risk analyzers (e.g., fraud detection companies) assess the risk of a new application based on, e.g., credit history, sanctions lists, etc., but do not take into consideration past decisions made by an organization. The present disclosure analyzes past decisions to make new application decisions more consistent (e.g., by a single administrator, across an organization, etc.).

According to one aspect, there is provided a device for providing a recommendation concerning an account opening request being reviewed. The computing device includes memory and circuitry. The memory includes a non-transitory computer readable medium and stores past decisions made regarding past account opening requests as past account opening records. The past account opening records each include: a result comprising grant or denial of the past account opening request associated with the record; and properties of the past account opening request associated with the record including a risk score determined for the request associated with the record. The received account opening request includes properties including a risk score determined for the received account opening request. The memory also stores a grant machine learning algorithm and a denial machine learning algorithm. The circuitry is configured to access the past account opening records stored in the memory, receive the account opening request, and determine a recommendation for granting or denying the received account opening request. The determination comprises performing the following rules using the circuitry. Rule 1: determine past grant records comprising the stored past account opening records including a result of grant. Rule 2: determine past denial records comprising the stored past account opening records including a result of denial. Rule 3: configure the grant machine learning algorithm, such that the grant machine learning algorithm outputs a likelihood that an inputted account opening request is granted. Rule 4: configure the denial machine learning algorithm, such that the denial machine learning algorithm outputs a likelihood that an inputted account opening request is denied. Rule 5: train the grant machine learning algorithm using the determined past grant records, such that the outputted likelihood that an inputted account opening request is granted depends on: the properties of the inputted account opening request and the results and properties of the determined past grant records. Rule 6: store the trained grant machine learning algorithm in the memory. Rule 7: train the denial machine learning algorithm using the determined past denial records, such that the outputted likelihood that an inputted account opening request is denied depends on: the properties of the inputted account opening request; and the results and properties of the determined past denial records. Rule 8: store the trained denial machine learning algorithm in the memory. Rule 9: input the received account opening request to the trained grant machine learning algorithm and receive the likelihood of grant output by the grant machine learning algorithm. Rule 10: input the received account opening request to the trained denial machine learning algorithm and receive the likelihood of denial output by the denial machine learning algorithm. Rule 11: calculate the recommendation for granting the received account opening request, denying the received account opening request, or no recommendation based on the received likelihood of grant and the received likelihood of denial. The circuitry is also configured to output the recommendation for granting or denying the received account opening request.

Alternatively or additionally, further comprising a display device. The circuitry is further configured to display on the display device the outputted recommendation for granting or denying the received account opening request.

Alternatively or additionally, the circuitry is further configured to cause the display device to display along with the outputted recommendation at least one of the properties of the received account opening request.

Alternatively or additionally, further comprising an input device for receiving an input from a user of the device. The circuitry is further configured to cause the display to display a user interface along with the outputted recommendation and the at least one of the properties of the received account opening request. The user interface includes an input for selecting using the input device a denial or a grant of the received account opening request.

Alternatively or additionally, the circuitry is additionally configured to receive the selected input and identify the received account opening request as denied or granted in accordance with the received input.

Alternatively or additionally, the recommendation for granting or denying the received account opening request comprises a grant score based on the received likelihood of grant and a deny score based on the received likelihood of denial.

Alternatively or additionally, the recommendation for granting or denying the received account opening request comprises a total score based on a combination of the received likelihood of grant and the received likelihood of denial.

Alternatively or additionally, when the received likelihood of grant is above a predetermined grant threshold, the outputting of the recommendation for granting or denying the received account opening request comprises identifying the received account opening request as granted. When the received likelihood of denial is above a predetermined denial threshold, the outputting of the recommendation for granting or denying the received account opening request comprises identifying the received account opening request as denied.

Alternatively or additionally, when the received likelihood of grant is above a predetermined grant high threshold and the received likelihood of denial is below a predetermined denial low threshold, the outputting of the recommendation for granting or denying the received account opening request comprises identifying the received account opening request as granted. When the received likelihood of denial is above a predetermined denial high threshold and the received likelihood of denial is below a predetermined denial low threshold, the outputting of the recommendation for granting or denying the received account opening request comprises identifying the received account opening request as denied.

Alternatively or additionally, at least one of the grant machine learning algorithm or the denial machine learning algorithm comprises at least one of a neural network, a support vector machine.

Alternatively or additionally, the risk score is received from a system configured to output a risk of fraud based on data included in a received account opening request.

Alternatively or additionally, the account opening request being reviewed includes missing data, inaccurate data, or an inconclusive risk score.

Alternatively or additionally, the account opening request comprises at least one of a request to open an account at a financial institution or a request to add a service to an account.

Alternatively or additionally, the properties of the past account opening record and the properties of the received account opening request include at least one of a credit score, credit history, an annual income, occupation, debit tools, history of non-payment of accounts, past bankruptcy, investment portfolio, savings amount, or investment amount.

The present disclosure also provides a method for providing a recommendation concerning an account opening request being reviewed using machine learning. The method includes (using circuitry) accessing past decisions made regarding past account opening requests stored as past account opening records in a memory comprising a non-transitory computer readable medium. The past account opening records each include: a result comprising grant or denial of the past account opening request associated with the record; and properties of the past account opening request associated with the record including a risk score determined for the request associated with the record. The received account opening request includes properties including a risk score determined for the received account opening request. The method also includes receiving with the circuitry the account opening request. The method further includes (using the circuitry) determining a recommendation for granting or denying the received account opening request. The determination comprises performing the following rules using the circuitry. Rule 1: determine past grant records comprising the stored past account opening records including a result of grant. Rule 2: determine past denial records comprising the stored past account opening records including a result of denial. Rule 3: configure a grant machine learning algorithm stored in the memory, such that the grant machine learning algorithm outputs a likelihood that an inputted account opening request is granted. Rule 4: configure a denial machine learning algorithm stored in the memory, such that the denial machine learning algorithm outputs a likelihood that an inputted account opening request is denied. Rule 5: train the grant machine learning algorithm using the determined past grant records, such that the outputted likelihood that an inputted account opening request is granted depends on: the properties of the inputted account opening request; and the results and properties of the determined past grant records. Rule 6: store the trained grant machine learning algorithm in the memory. Rule 7: train the denial machine learning algorithm using the determined past denial records, such that the outputted likelihood that an inputted account opening request is denied depends on: the properties of the inputted account opening request; and the results and properties of the determined past denial records. Rule 8: store the trained denial machine learning algorithm in the memory. Rule 9: input the received account opening request to the trained grant machine learning algorithm and receive the likelihood of grant output by the grant machine learning algorithm. Rule 10: input the received account opening request to the trained denial machine learning algorithm and receive the likelihood of denial output by the denial machine learning algorithm. Rule 11: calculate the recommendation for granting or denying the received account opening request based on the received likelihood of grant and the received likelihood of denial. The method also includes (using the circuitry) outputting the recommendation for granting or denying the received account opening request.

Alternatively or additionally, further comprising displaying on a display device the outputted recommendation for granting or denying the received account opening request.

Alternatively or additionally, the outputted recommendation is displayed along with at least one of the properties of the received account opening request.

Alternatively or additionally, the method further comprising receiving from an input device an input from a user and displaying a user interface along with the outputted recommendation and the at least one of the properties of the received account opening request. The user interface includes an input for selecting using the input device a denial or a grant of the received account opening request. The method also includes receiving the selected input and identifying using the circuitry the received account opening request as denied or granted in accordance with the received input.

Alternatively or additionally, when the received likelihood of grant is above a predetermined grant threshold, the outputting of the recommendation for granting or denying the received account opening request comprises identifying the received account opening request as granted. When the received likelihood of denial is above a predetermined denial threshold, the outputting of the recommendation for granting or denying the received account opening request comprises identifying the received account opening request as denied.

Alternatively or additionally, when the received likelihood of grant is above a predetermined grant high threshold and the received likelihood of denial is below a predetermined denial low threshold, the outputting of the recommendation for granting or denying the received account opening request comprises identifying the received account opening request as granted. When the received likelihood of denial is above a predetermined denial high threshold and the received likelihood of denial is below a predetermined grant low threshold, the outputting of the recommendation for granting or denying the received account opening request comprises identifying the received account opening request as denied.

A method for automatically opening an account through a received account opening request using machine learning performed on circuitry is described. The method is made up of the steps of (1) creating a plurality of machine learning rules engines, using the circuitry, by accessing past decisions made regarding past account opening requests stored as past account opening records in a memory comprising a non-transitory computer readable medium, the plurality of machine learning rules engines created by executing a machine learning algorithm on the past account opening records. The plurality of machine learning rules engines include a grant rules engine and an options rules engine. The past account opening records each include a result made up of a grant or denial of the past account opening requests associated with the past account opening records, past options selected and other products purchased associated with the past account opening records, and properties of the past account opening requests associated with the past account opening records including a risk score determined for the past account opening requests associated with the past account opening records. The method also includes the steps of (2) receiving, with the circuitry, the received account opening request, (3) determining a recommendation, using the circuitry, for granting or denying the received account opening request, wherein the determination comprises executing the grant rules engine on the properties of the received account opening request using the circuitry, thus creating a grant rules engine result, (4) prompting a user, using the circuitry, for new options using a first customized screen generated by the options rules engine where the options rules engine determines a first selection and a first order of options on the first customized screen; and (5) granting or denying the received account opening request, using the circuitry.

In some embodiments, the plurality of machine learning rules engines also includes a denial rules engine. In some cases, the determining of the recommendation also comprises executing the denial rules engine on the properties of the received account opening request using the circuitry, thus creating a denial rules engine result. The determining of the recommendation could further include mathematically combining the grant rules engine result with the denial rules engine result. In some embodiments, the granting or denying of the received account opening request is based on a comparison of the mathematical combination of the grant rules engine result with the denial rules engine result with a threshold. In other embodiments, the granting or denying of the received account opening request is based on a comparison of the grant rules engine result with a threshold.

The plurality of machine learning rules engines could also include a cross sales rules engine. The method could further include (6) prompting the user, using the circuitry, for additional products using a second customized screen generated by the cross sales rules engine where the cross sales rules engine determines a second selection and a second order of cross sales products on the second customized screen.

The machine learning algorithm could be a Densicube algorithm, a KMeans algorithm, Random Forest algorithm, or another machine learning algorithm. The plurality of machine learning rules engines could be created in parallel or in series. The account could be a checking account, a loan account, a credit card account, or another type of account.

A computing device for automatically opening an account through a received account opening request using machine learning is described herein. The computing device includes a memory that is made of a non-transitory computer readable medium. The memory stores past decisions made regarding past account opening requests as past account opening records. The past account opening records each include a result comprising grant or denial of the past account opening requests associated with the past account opening records, past options selected and other products purchased associated with the past account opening records, and past properties of the past account opening requests associated with the past account opening records including risk scores determined for the past account opening requests associated with the past account opening records.

The memory also stores a plurality of machine learning rules engines, the plurality of machine learning rules engines created by executing a machine learning algorithm on the past account opening records, where the plurality of machine learning rules engines include a grant rules engine and an options rules engine. The memory also stores the received account opening request which includes received properties, the received properties including a risk score for the received account opening request.

The computing device also includes circuitry configured to receive the received account opening request, determine a recommendation for granting or denying the received account opening request, wherein the determination comprises execution of the grant rules engine on the received properties of the received account opening request, the execution creating a grant rules engine result, prompt a user for received options using a customized screen generated by the options rules engine where the options rules engine determines a selection and an order of the options on the customized screen; and automatically grant or deny the received account opening request.

In some embodiments, the risk score is received from a system configured to output a risk of fraud based on data included in the received account opening request. The received account opening request being reviewed could include missing data, inaccurate data, or an inconclusive risk score. The received account opening request could be made up of at least one of a request to open the account at a financial institution or to add a service to the account. The past properties of the past account opening records and the received properties of the received account opening request could include at least one of a credit score, credit history, an annual income, occupation, debit tools, history of non-payment of accounts, past bankruptcy, investment portfolio, savings amount, or investment amount.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

DETAILED DESCRIPTION

Figure 1:
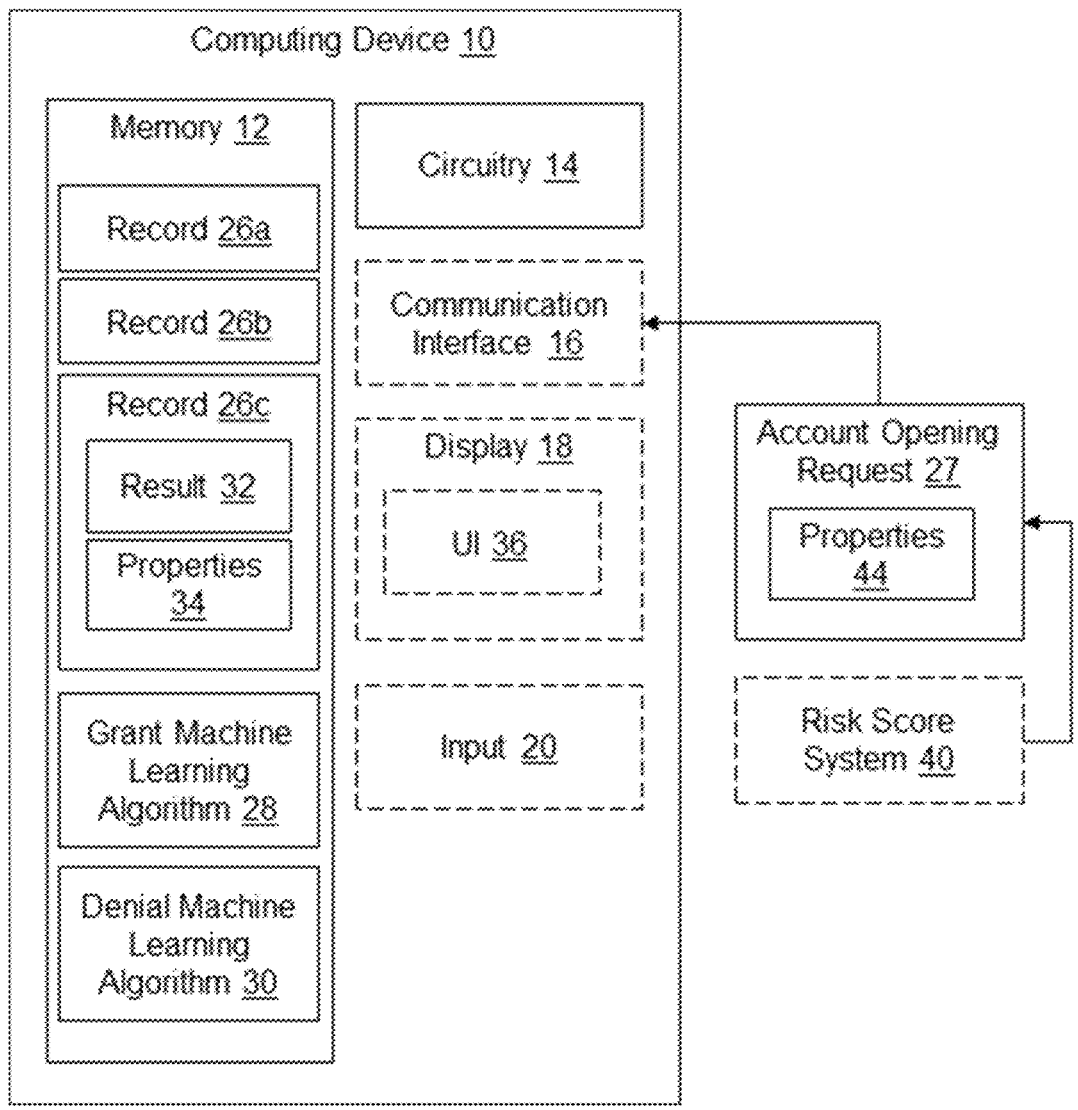
FIG. 1 is a schematic diagram of an exemplary computing device according to the invention.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

The present invention provides a device including circuitry and memory. The circuitry uses machine learning techniques to analyze past decisions concerning account opening requests that are stored in the memory. The circuitry outputs a recommendation regarding whether an account opening request should be allowed or denied.

Turning to FIG. 1, an exemplary computing device 10 for providing a recommendation concerning an account opening request being reviewed is shown. The device 10 includes memory 12 and circuitry 14. The device 10 may also include a communication interface 16, a display 18, and/or an input 20. The memory 12 stores past decisions made regarding past account opening requests as past account opening records 26a, 26b, 26c. The circuitry 14 accesses the past account opening records 26a, 26b, 26c and determines a recommendation 29 for granting or denying a received account opening request based upon the past account opening records 26a, 26b, 26c.

Figure 8:
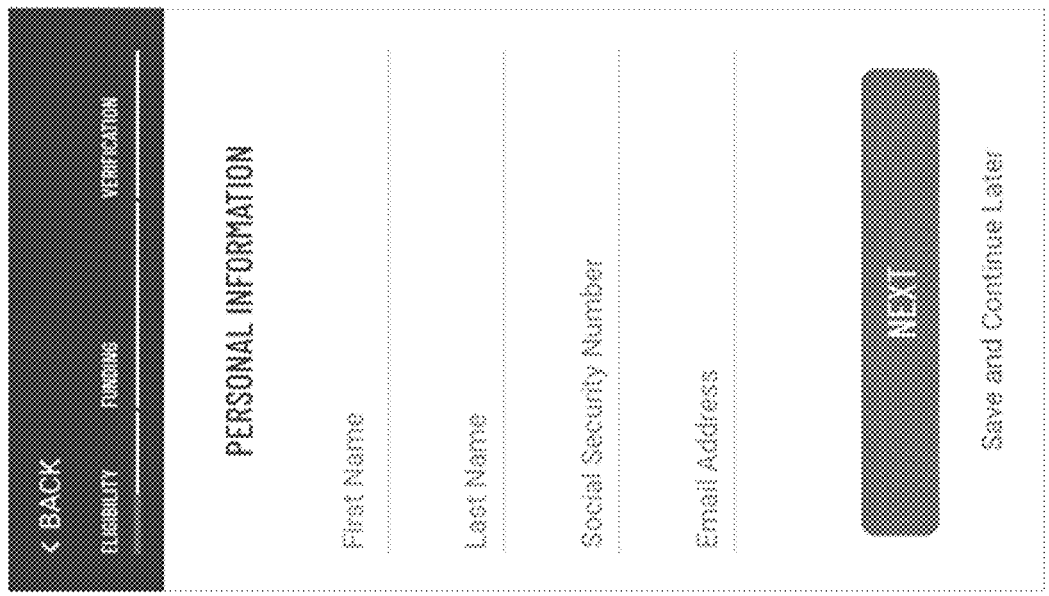
FIG. 8 is a screen shot of one of the account opening screens.

The account opening request 27 may be received by the circuitry from the communication interface 16. The account opening request 27 may include at least one of a request to open an existing account at a financial institution or a request to add a service to an account. The account opening request 27 may be passed to the computing device 10 for making a recommendation 29 when the account opening request 27 includes missing data, inaccurate data, or an inconclusive risk score is received, e.g., from a risk score system 40. A sample screen for receiving the account opening request 27 can be seen in FIG. 8.

As described above, the memory 12 stores a grant machine learning algorithm 28, a denial machine learning algorithm 30, and past decisions made regarding past account opening requests as past account opening records 26a, 26b, 26c. The past account opening records 26a, 26b, 26c each include a result 32 and properties 34 of the past account opening request associated with the record 26a, 26b, 26c. The result 32 includes a grant or denial of the past account opening request associated with the record 26a, 26b, 26c. The properties 34 of the past account opening request associated with the record include a risk score determined for the request associated with the record 26a, 26b, 26c.

The past account opening records 26a, 26b, 26c may be limited to records associated with a particular administrator that has been assigned to review (i.e., is associated with) the received account opening request 27. In this way, decisions made by the particular administrator may only be used when making a recommendation 29 and the decisions made by individual administrators may be improved. Conversely, the past account opening records 26a, 26b, 26c may include records associated with a particular organization (e.g., a specific financial institution) without regard to the particular administrator associated with the account opening request 27. In this way, decisions made across the particular organization may be made more consistent across different administrators.

The past account opening records 26a, 26b, 26c may also be limited in time. For example, only recent past account opening records 26a, 26b, 26c may be used (e.g., within the last year, 6 months, 1 month, etc.) to ensure that recent changes in organization procedures are adapted and used consistently. As another example, past account opening records 26a, 26b, 26c over a longer duration of time (e.g., 2 years, 5 years, 10 years, all available records, etc.) may be used to improve consistency of decision over time.

The properties 44 of the past account opening records 26a, 26b, 26c and the properties 44 of the received account opening request 27 may include at least one of a credit score, credit history, an annual income, occupation, debit tools, history of non-payment of accounts, past bankruptcy, investment portfolio, savings amount, or investment amount. As will be understood by one of ordinary skill in the art, the properties 34, 44 may include any suitable data for making a determination regarding granting or denying an account opening request.

The risk score may be received from a system 40 configured to output a risk of fraud based on data (e.g., the properties 44) included in a received account opening request 27. For example, the system 40 could be an outside third party, an internal tool, or a combination thereof.

As will be understood by one of ordinary skill in the art, the memory 12 may comprise one or more of a buffer, a flash memory, a hard drive, a removable media, a volatile memory, a non-volatile memory, a random access memory (RAM), or other suitable device. In a typical arrangement, the memory 12 may include a non-volatile memory for long term data storage and a volatile memory that functions as system memory for the circuitry 14. The memory 12 may exchange data with the circuitry 14 over a data bus. Accompanying control lines and an address bus between the memory 12 and the circuitry 14 also may be present. The memory 12 may be considered a non-transitory computer readable medium.

Figure 2:
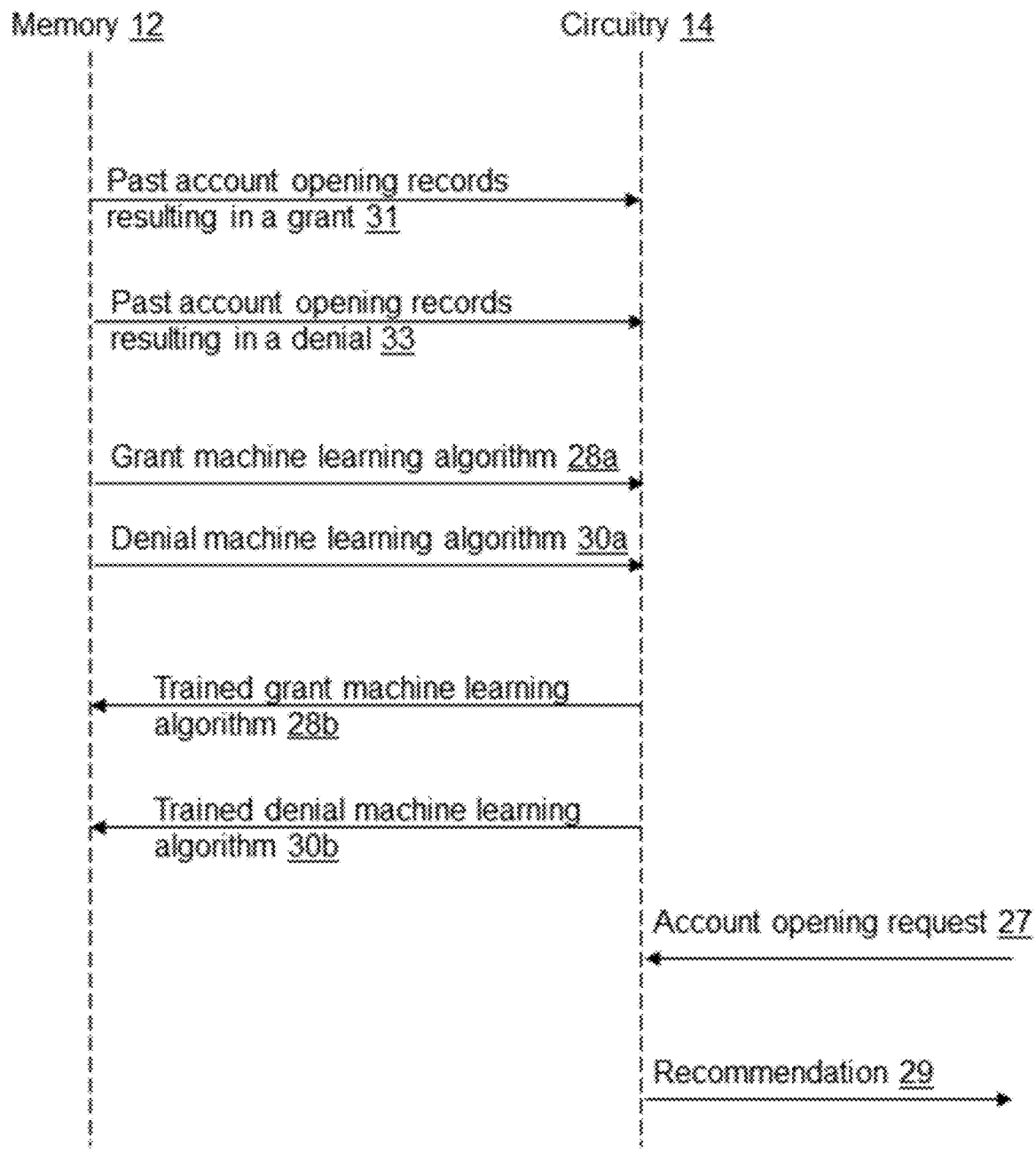
FIG. 2 is a ladder diagram depicting movement of information between the circuitry and memory of FIG. 1.

Turning to FIG. 2, the circuitry 14 is configured to access the past account opening records 26a, 26b, 26c stored in the memory 12 and to receive an account opening request 27. The circuitry 14 is also configured to determine a recommendation 29 for granting or denying the received account opening request and to output the recommendation 29 for granting or denying the received account opening request 27. The recommendation is determined by performing the following rules using the circuitry 14.

In rule 1, the circuitry 14 determines past grant records 31 comprising the stored past account opening records 26a, 26b, 26c including a result 32 of grant. That is, the circuitry 14 determines the stored past account opening records 26a, 26b, 26c where the account opening record was granted (e.g., an account was opened). In rule 2, the circuitry determines past denial records 33 comprising the stored past account opening records 26a, 26b, 26c including a result 32 of denial. That is, the circuitry 14 determines the stored past account opening records 26a, 26b, 26c where the account opening record was denied (e.g., an account was not opened).

In rule 3, the circuitry 14 configures the grant machine learning algorithm 28, such that the grant machine learning algorithm 28 outputs a likelihood 35 that an inputted account opening request 27 is granted. In rule 4, the circuitry 14 configures the denial machine learning algorithm 30, such that the denial machine learning algorithm 28 outputs a likelihood 37 that an inputted account opening request 27 is denied. The received account opening request 27 includes properties including a risk score determined for the received account opening request 27.

Rules 3 and 4 may be performed by a separate electronic device (e.g., a computer) at any time prior to training the machine learning algorithms 28, 30 by the circuitry 14. For example, the structure of the machine learning algorithms 28, 30 may already be determined and the circuitry 14 may simply access the machine learning algorithms 28, 30 to perform rules 3 and 4.

At least one of the grant machine learning algorithm 28 or the denial machine learning algorithm 30 may be a neural network, a support vector machine, or any other suitable machine learning algorithm. The grant machine learning algorithm 28 or the denial machine learning algorithm 30 may utilize supervised learning, unsupervised learning, or semi-supervised learning.

The grant machine learning algorithm 28 and/or the denial machine learning algorithm 30 may comprise a neural network. As an example, the grant machine learning algorithm 28 and/or the denial machine learning algorithm 30 may comprise a bidirectional recurrent neural network (BRNN) and the machine learning algorithm(s) 28, 30 may be configured to output a Boolean result. For example, the grant machine learning algorithm 28 outputting a "1" may indicate that an account opening request 29 should be granted and the grant machine learning algorithm 28 outputting a "0" may indicate that an account opening request 29 should not be opened or "no opinion" regarding whether the account opening request 27 should be granted. Similarly, the denial machine learning algorithm 30 outputting a "1" may indicate that an account opening request 29 should be denied and the denial machine learning algorithm 30 outputting a "0" may indicate that an account opening request 29 should not be denied or "no opinion" regarding whether the account opening request 27 should be denied.

In another example, the machine learning algorithm(s) 28, 30 may output a value within a range (e.g., between 0 and 1). For example, the closer the value outputted by the grant machine learning algorithm 28 is to one end of the range (e.g., "1") the more likely that an account opening request 29 should be granted. Similarly, the closer the value outputted by the denial machine learning algorithm 28 is to one end of the range (e.g., "1") the more likely that an account opening request 29 should be denied.

Figure 3:
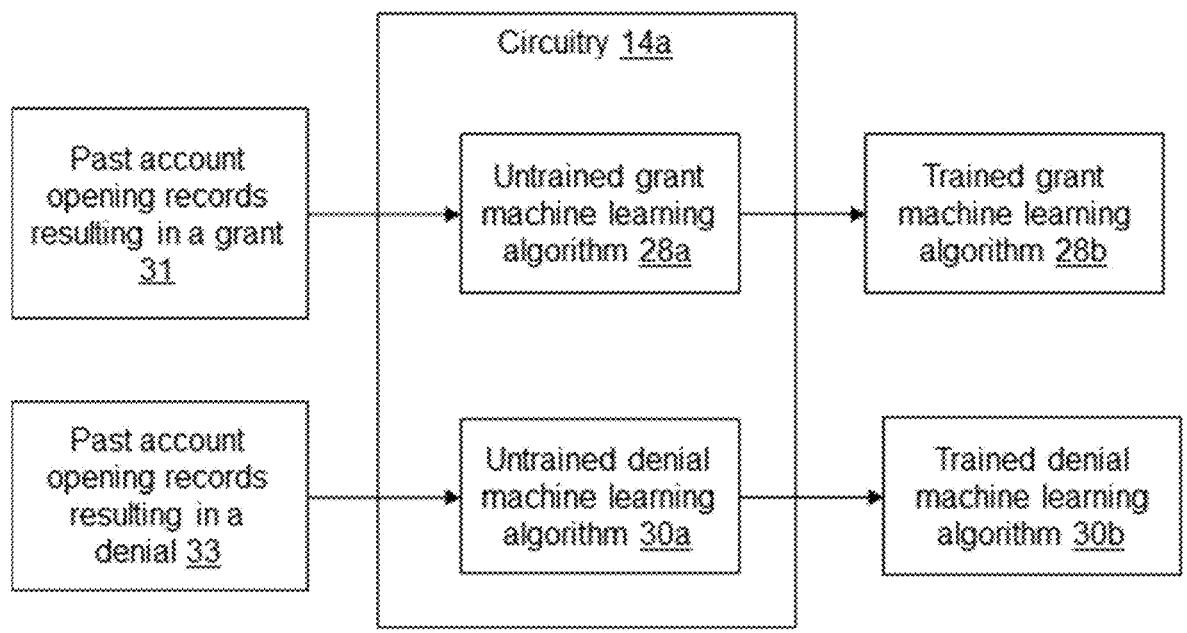
FIG. 3 is a block diagram depicting training of the grant machine learning algorithm and the denial machine learning algorithm.
Figure 4:
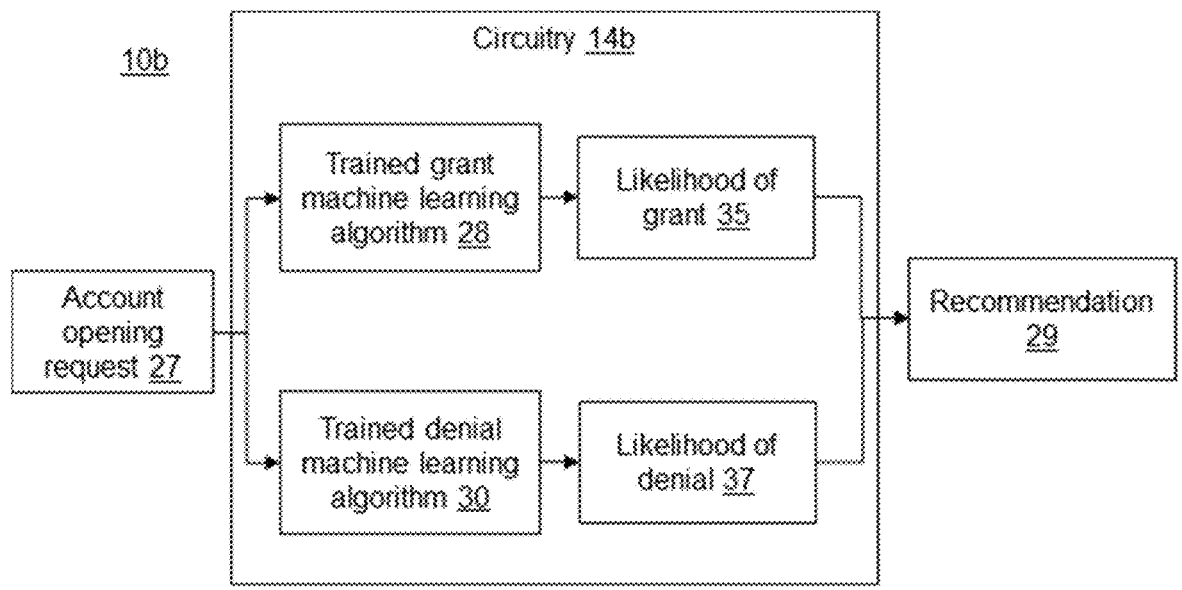
FIG. 4 is a block diagram depicting classification of an account opening request by the grant machine learning algorithm and the denial machine learning algorithm.

Turning to FIGS. 2-4, in rule 5, the circuitry 14 trains the grant machine learning algorithm 28 using the determined past grant records 31, such that the outputted likelihood 35 that an inputted account opening request is granted depends on: (1) the properties 44 of the inputted account opening request 27 and (2) the results 32 and properties 34 of the determined past grant records 31. In rule 6, the circuitry stores the trained grant machine learning algorithm 28 in the memory 12.

In the drawings reference numerals 28a and 28b are used to differentiate between the untrained and trained grant machine learning algorithm, respectively, when both the trained and untrained grant machine learning algorithm are shown in the same figure. In figures where both the trained and untrained grant machine learning algorithms are not both present, only reference numeral 28 may be used. Similar comments apply regarding the denial machine learning algorithm and reference numerals 30a and 30b.

In rule 7, the circuitry 14 trains the denial machine learning algorithm 30 using the determined past denial records 33, such that the outputted likelihood that an inputted account opening request is denied 37 depends on: (1) the properties 44 of the inputted account opening request 27 and (2) the results 32 and properties 34 of the determined past denial records 33. In rule 8, the circuitry 14 causes the trained denial machine learning algorithm 28b to be stored in the memory 12.

Turning to FIGS. 3 and 4, rules 1-8 may be performed by a separate device 10a from the device 10b performing rules 9 and 10. For example, the computing device 10 may comprise two separate devices 10a, 10b. Each device 10a, 10b may include circuitry 14a, 14b. The first device 10a of the two separate devices 10a, 10b may perform rules 1-8 using circuitry 14a local to the first device 10a. The circuitry 14a may store the trained machine learning algorithms 28, 30 in memory 12 accessible (e.g., accessible over a network) by the circuitry 14a of the first device 10 and the circuitry 14b of the second device 10b of the two separate devices 10a, 10b. The circuitry 14b of the second device 10b may then access the trained machine learning algorithms 28, 30 in the memory 12 and input the account opening request 27 in rules 9 and 10 to determine the likelihood of grant 35 and the likelihood of denial 37. Alternatively, rules 1-10 may all be performed by circuitry 14 located in the same device 10.

In rule 9, the circuitry 14 inputs the received account opening request 27 to the trained grant machine learning algorithm 28 and receives the likelihood of grant 35 output from the grant machine learning algorithm 28. Similarly, in rule 10, the circuitry 14 inputs the received account opening request 27 to the trained denial machine learning algorithm 30 and receives the likelihood of denial 37 output by the denial machine learning algorithm 30.

While receiving the account opening request 27 is described prior to rules 1-8, the account opening request 27 may be received by the circuitry 14 after performance of rules 1-8.

In rule 11, the circuitry 14 calculates the recommendation 29 for (1) granting the received account opening request 27, (2) denying the received account opening request 27, or (3) no recommendation. The recommendation 29 is calculated based on the received likelihood of grant 35 and the received likelihood of denial 37.

As will be understood by one of ordinary skill in the art, the circuitry 14 may have various implementations. For example, the circuitry 14 may include any suitable device, such as a processor (e.g., CPU), programmable circuit, integrated circuit, memory and I/O circuits, an application specific integrated circuit, microcontroller, complex programmable logic device, other programmable circuits, or the like. The circuitry 14 may also include a non-transitory computer readable medium, such as random access memory (RAM), a read-only memory (ROM), an erasable programmable read-only memory (EPROM or Flash memory), or any other suitable medium. Instructions for performing the method 100 described below may be stored in the non-transitory computer readable medium and executed by the circuitry 14. The circuitry 14 may be communicatively coupled to the memory 12 and a communication interface 16 through a system bus, mother board, or using any other suitable structure known in the art.

Turning back to FIG. 1, the device 10 may also include a display device 18. The circuitry 14 may be configured to cause the display device 18 to display the outputted recommendation 29 for granting or denying the received account opening request 27. For example, the circuitry 14 may be further configured to cause the display device 18 to display along with the outputted recommendation 29 at least one of the properties 44 of the received account opening request 27. In this way, an administrator reviewing account opening request 27 may view the properties 44 needed to make an informed decision regarding granting or denying the request along with the recommendation 29.

As will be understood by one of ordinary skill in the art, the display device 18 may have various implementations. For example, the display device 18 may comprise any suitable device for displaying information, such as a liquid crystal display, light emitting diode display, a CRT display, an organic light emitting diode (OLED) display, a computer monitor, a television, a phone screen, or the like. The display device 18 may also include an interface (e.g., HDMI input, USB input, etc.) for receiving information to be displayed.

The device 10 may also include an input device 20 for receiving an input from a user of the device 10. For example, when displaying the recommendation 29 and the at least one of the properties 44 of the received account opening request 27, the user interface 36 may include an input for selecting (using the input device 20) a denial or a grant of the received account opening request. The circuitry 14 may be configured to receive the selected input and identify the received account opening request as denied or granted in accordance with the received input. The circuitry 14 may then cause the communication interface 16 to transmit the selected input (i.e., to deny or grant the account opening request 27). The circuitry 14 may also cause the account opening request 27 to be stored as a past account opening record 26a, 26b, 26c, including (as properties 34) the properties 44 of the account opening request 27 and (as the result 32) the selected input.

As the past account opening records 26a, 26b, 26c are updated by the circuitry 14 to include account opening requests 27 that have been decided by an administrator (i.e., that have a result 32), the training of the machine learning algorithms 28, 30 may be updated (also referred to as the machine learning algorithms 28, 30 being updated). In this way, performance of the machine learning algorithms 28, 30 may be continuously or periodically updated. For example, the machine learning algorithms 28, 30 may be updated daily, weekly, monthly, or based on the number of new past account opening records 26a, 26b, 26c (e.g., every 100, 250, or 1000 new past account opening records 26a, 26b, 26c).

As will be understood by one of ordinary skill in the art, the input device 20 may have various implementations. For example, the input device 20 may comprise any suitable device for inputting data into an electronic device, such as a keyboard, mouse, trackpad, touch screen (e.g., as part of the display device 18), microphone, or the like.

As will be understood by one of ordinary skill in the art, the communication interface 16 may comprise a wireless network adaptor, an Ethernet network card, or any suitable device that provides an interface between the device 10 and a network. The communication interface 16 may be communicatively coupled to the memory 12, such that the communication interface 16 is able to send data stored on the memory 12 across the network and store received data on the memory 12. The communication interface 16 may also be communicatively coupled to the circuitry 14 such that the circuitry 14 is able to control operation of the communication interface 16. The communication interface 16, memory 12, and circuitry 14 may be communicatively coupled through a system bus, mother board, or using any other suitable manner as will be understood by one of ordinary skill in the art.

The recommendation 29 for granting or denying the received account opening request 27 may comprise a grant score based on the received likelihood of grant 35 and a deny score based on the received likelihood of denial 37. For example, (instead of simply being grant, deny, or no decision), the recommendation 29 for granting or denying the received account opening request may comprise a total score based on a combination of the received likelihood of grant 35 and the received likelihood of denial 37.

The recommendation 29 may also be calculated from the received likelihood of grant 35 and the received likelihood of denial 37 using any suitable method. For example, the recommendation 29 may be calculated using a machine learning algorithm. In this example, a recommendation machine learning algorithm may take as an input the received likelihood of grant 35 and the received likelihood of denial 37 and output the recommendation 29. The recommendation machine learning algorithm may be trained using the past account opening records 26a, 26b, 26c (including the result 32) and the likelihood of grant 35 and denial 37 output by the grant and denial machine learning algorithms 28, 30, respectively. Because the output of the recommendation machine learning algorithm depends on the output of the grant and denial machine learning algorithms 28, 30, the grant and denial machine learning algorithms 28, 30 may be trained before and separately from the recommendation machine learning algorithm. Conversely, the recommendation, grant, and denial machine learning algorithms may all be trained at the same time.

As opposed to using a separate machine learning algorithm, the recommendation 29 may be calculated from the likelihood of grant 35 and the likelihood of denial 37 using rules. As an example, when the received likelihood of grant 35 is above a predetermined grant threshold, the outputted recommendation 29 may be to identify the received account opening request 27 as granted. Alternatively, when the received likelihood of denial 37 is above a predetermined denial threshold, the outputted recommendation 29 may be to identify the received account opening request 27 as denied. If both the received likelihood of grant 35 and the received likelihood of denial 37 are both above the predetermined grant threshold and the predetermined denial threshold, respectively, then an inconclusive recommendation 29 may be outputted. That is, the device 10 may indicate that there is not a recommended to grant or deny the received account opening request 27.

As another example, when the received likelihood of grant 35 is above a predetermined grant high threshold and the received likelihood of denial is below a predetermined denial low threshold, the outputted recommendation 29 may be to identify the received account opening request 27 as granted. When the received likelihood of denial 37 is above a predetermined denial high threshold and the received likelihood of grant is below a predetermined grant low threshold, the outputted recommendation 29 may be to identify the received account opening request 27 as denied. If (1) the received likelihood of grant 35 is between the predetermined grant high threshold and the predetermined grant low threshold and (2) the received likelihood of denial 37 is between the predetermined denial high threshold and the predetermined denial low threshold, then no (or an inconclusive) recommendation 29 may be outputted.

The recommendation 29 may additionally include a confidence measure dependent upon the likelihood of grant 35 and the likelihood of denial 37. For example, (1) the grant machine learning algorithm 28 may output a likelihood of grant 35 and a grant confidence measure and (2) the denial machine learning algorithm 30 may output a likelihood of denial 35 and a denial confidence measure. The grant confidence measure and the denial confidence measure may be an indication of how similar the received account opening request 27 is to past account opening records 26a, 26b, 26c. For example, the properties 44 of the received account opening request 27 may be compared to the properties 34 of the past account opening records 26a, 26b, 26c. The more similar the received account opening request 27 is to one or more of the past account opening records 26a, 26b, 26c, the higher the confidence score may be. For example, if the received account opening request 27 is similar to one or more past account opening records that were denied, then the denial confidence score may be higher.

Alternatively or additionally, the device 10 may determine a performance measure. The performance measure may be based upon the number of times that an administrator agrees with the recommendation 29. For example, if the recommendation 29 is to deny and the administrator agrees with the recommendation and denies the account opening request, then the performance measure may increase. Conversely, if the recommendation is to deny and the administrator disagrees with the recommendation and allows the account opening request, then the performance measure may decrease.

The performance measure may be adjusted to measure lifetime performance or performance during a particular time span. For example, the performance measure may be based upon only the past three months (or any suitable duration of time) and all previous performance may be disregarded.

If the performance measure and/or the confidence measure is above a given threshold, then the circuitry 14 may make the final decision regarding allowing or denying the received account opening request 27. That is, if the performance measure and/or the confidence measure are above the given threshold to grant the received account opening request 27, then the received account opening request 27 may be granted by the circuitry 14 without intervention by a human administrator.

Figure 5:
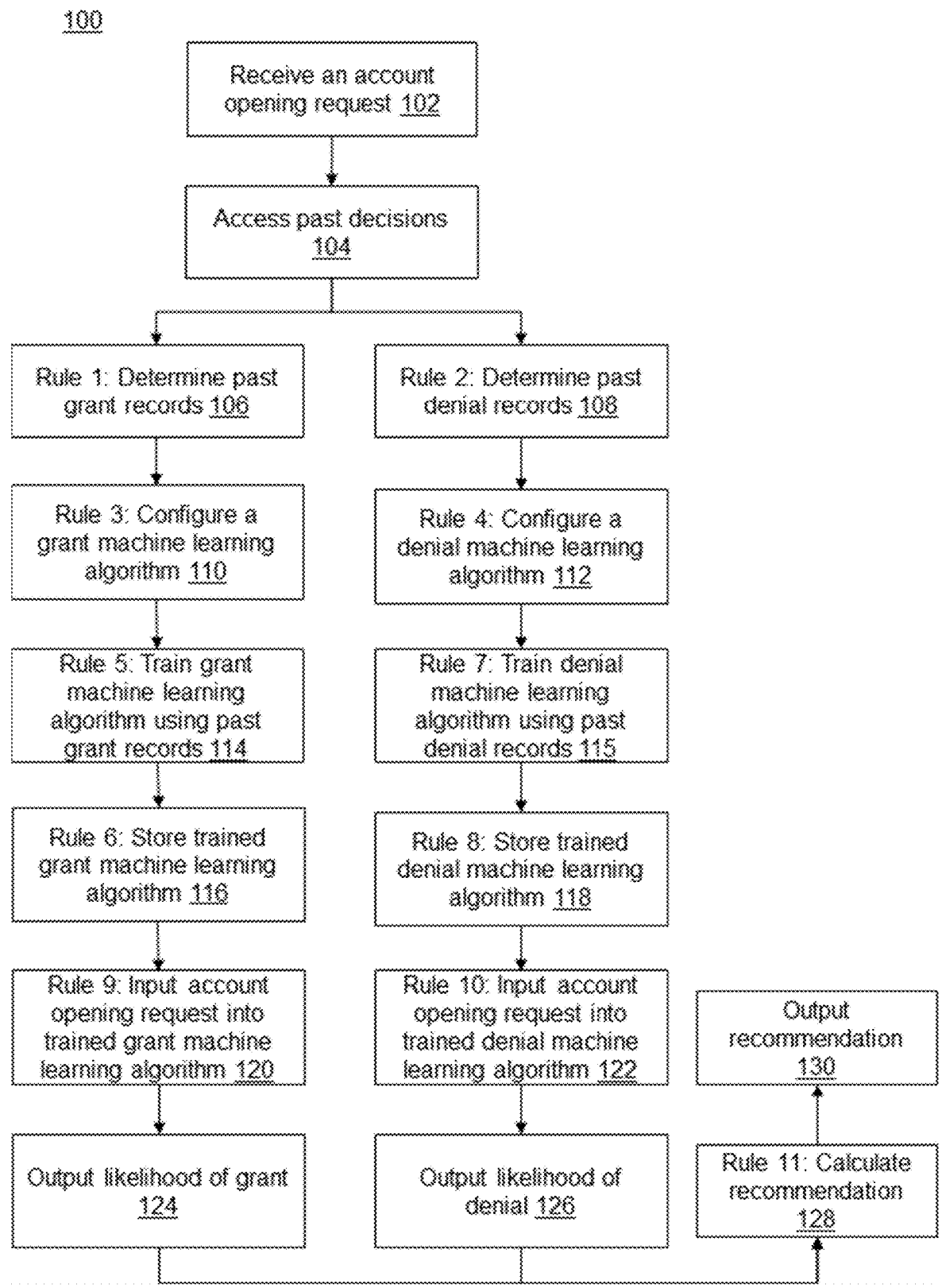
FIG. 5 is a flow diagram of a method for providing a recommendation concerning an account opening request according to the invention.

Turning to FIG. 5, a method 100 for providing a recommendation 29 concerning an account opening request 27 being reviewed using machine learning performed on circuitry 14 is shown.

In reference block 102, the circuitry 14 receives the account opening request 27. In reference block 104, the circuitry 14 accesses past decisions made regarding past account opening requests stored as past account opening records 26a, 26b, 26c in a memory 12 comprising a non-transitory computer readable medium. As described above, the past account opening records 26a, 26b, 26c each include a result 32 and properties 34. The result comprises grant or denial of the past account opening request associated with the record 26a, 26b, 26c. The properties 34 of the past account opening request associated with the record 26a, 26b, 26c include a risk score determined for the request associated with the record 26a, 26b, 26c. The received account opening request 27 also includes properties 44 including a risk score determined for the received account opening request 27.

In reference blocks 106-128, the circuitry 14 determines a recommendation for granting or denying the received account opening request 27.

In reference block 106, past grant records 31 comprising the stored past account opening records including a result of grant are determined. Similarly, in reference block 108, past denial records 33 comprising the stored past account opening records including a result of denial are determined.

In reference block 110, a grant machine learning algorithm 28 stored in the memory 12 is configured, such that the grant machine learning algorithm 28 outputs a likelihood that an inputted account opening request is granted 35. Similarly, in reference block 112, a denial machine learning algorithm 30 stored in the memory 12 is configured, such that the denial machine learning algorithm 30 outputs a likelihood that an inputted account opening request is denied 37. As described above, reference blocks 110 and 112 may be performed separately at any point in time prior to performing reference blocks 114 and 116.

In reference block 114, the grant machine learning algorithm 28 is trained using the determined past grant records, such that the outputted likelihood 35 that an inputted account opening request is granted depends on (1) the properties of the inputted account opening request 27 and (2) the results 32 and properties 34 of the determined past grant records 26a, 26b, 26c. In reference block 116, the trained grant machine learning algorithm 28 is stored in the memory 12.

In reference block 115, the denial machine learning algorithm 30 is trained using the determined past denial records, such that the outputted likelihood 37 that an inputted account opening request is denied depends on: (1) the properties of the inputted account opening request and (2) the results 32 and properties 34 of the determined past denial records. In reference block 118, the trained denial machine learning algorithm 30 is stored in the memory 12.

In reference block 120, the received account opening request 27 is inputted into the trained grant machine learning algorithm 28. Similarly in reference block 122, the received account opening request 27 is inputted into the trained denial machine learning algorithm 30.

In reference block 124, the likelihood of grant is outputted by the grant machine learning algorithm 28. Similarly, in reference block 126, the likelihood of denial is output by the denial machine learning algorithm 30.

In reference block 128, the recommendation 29 for granting or denying the received account opening request 27 is calculated based on the received likelihood of grant 35 and the received likelihood of denial 37. In reference block 130, the circuitry outputs the recommendation 29 for granting or denying the received account opening request. As described above, outputting the recommendation 29 may comprise displaying the recommendation 29, storing the recommendation 29, or transmitting (e.g., via the communication interface 16 over a network) the recommendation 29.

While reference block 102 is shown as occurring before reference blocks 104-118, reference block 102 may occur before during or after any of reference block 104-118. For example, the machine learning algorithms 28, 30 may be trained and stored in the memory 12 prior to receiving the account opening request 27.

Figure 6:
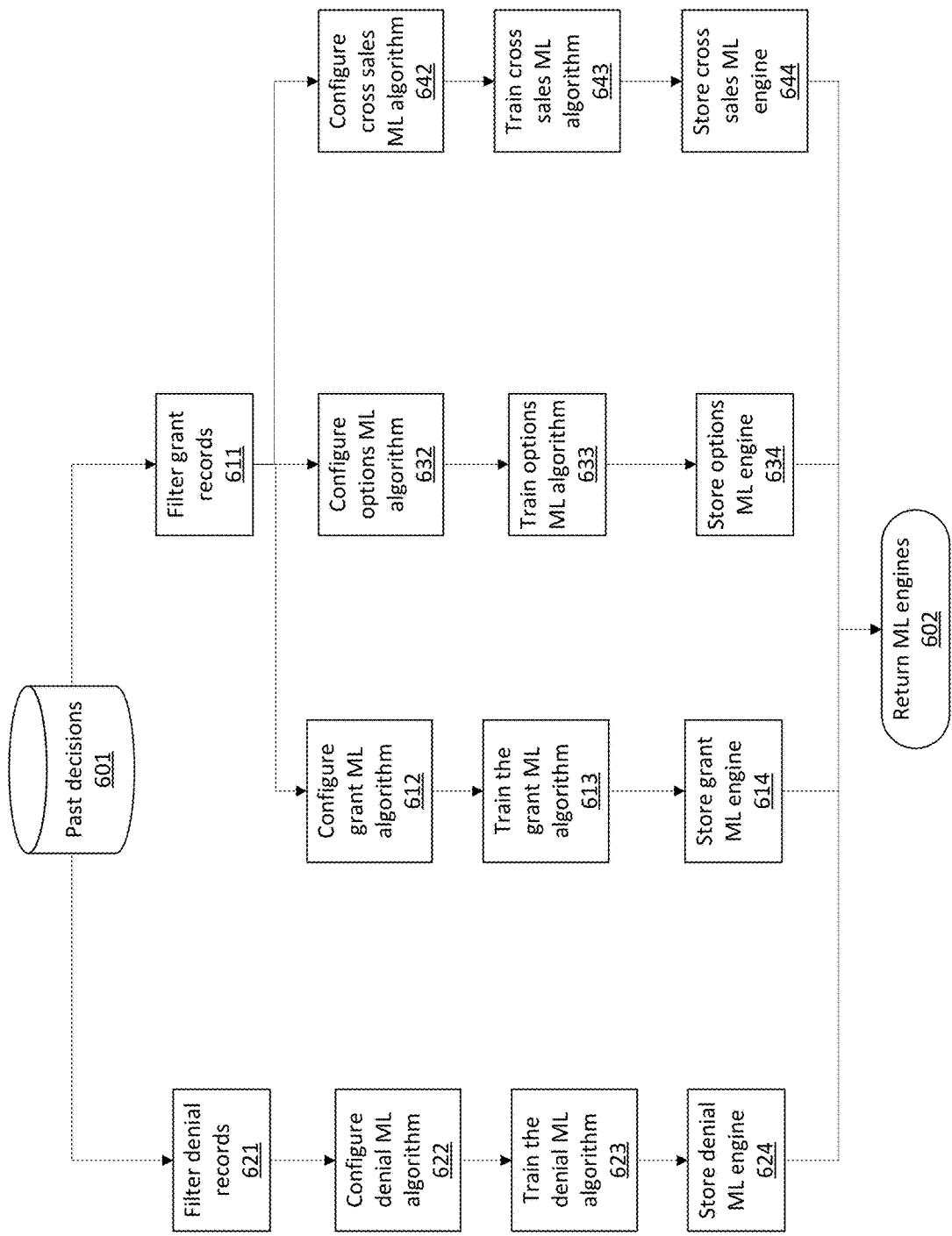
FIG. 6 is a flow charge of the creation of the machine learning engines in one embodiment.

Looking to FIG. 6, an alternative embodiment is shown where the creation of the machine learning engines is separate from the account openings. The machine learning engines are created in parallel in the drawing, although the building of the machine learning engines in series could be done without deviating from the inventions described herein. The machine learning engines could be built once, or built periodically, or built when a set number of new account opening decisions are added to the past account opening decision database 601.

The process starts with a database of past account opening decisions 601. Four different tracks process the database 601: one track looks at information relative to the granting of accounts 611,612,613,614, another looks at the denial of account openings 621,622,623,624, a third looks at the options selected with account openings 611,632,633,634, and the forth looks at additional items purchased with each account opening 611,642,643,644.

Each track is a four step process, starting with a filter of the records relevant to the track 611,621. In the denial track, all of the records in the past decisions database 601 are retrieved (or filtered) 621. These records related to denied account opening requests are sent to the configuration of the denial machine learning algorithm 622. The configuration 622 initializes and prepares for the processing of the training 613.

In the grant track, when filtering the records 611, only records related to account opening transactions are allowed to continue. Once filtered, the records related to granting are sent to the configuration of the grant machine learning algorithm 612, the configuration of the options machine learning engine 632, and the configuration of the cross sales machine learning engine 642.

Next, the machine learning algorithm is trained using the past decisions 613,623,633,643. The training of the machine learning algorithm could incorporate the Densicube algorithm as described in U.S. Pat. No. 9,489,627 or distributed Densicube algorithm as described in U.S. patent application Ser. No. 16/355,985. Other machine learning algorithms such as the KMeans algorithm or the Random Forest algorithm could also be used. The filtered records are fed into the machine learning algorithms to create the machine learning algorithm for account opening decisions 613, 623, 633, 643.

The following description outlines several possible embodiments to create models using distributed data. The Distributed DensiCube modeler and scorer described below, and in U.S. patent application Ser. No. 16/355,985, extend the predicative analytic algorithms that are described in U.S. Pat. No. 9,489,627 to extend their execution in distributed data environments and into quality analytics. The rule learning algorithm for DensiCube is briefly described below and in U.S. patent application Ser. No. 16/355,985. But the DensiCube machine learning algorithm is only one embodiment of the inventions herein. Other machine learning algorithms could also be used.

A distributed method for creating a machine learning rule set is described herein. The method is made up of the steps of (1) preparing, on a computer, a set of data identifiers to identify the data elements for training the machine learning rule set, (2) sending the set of data identifiers to a plurality of data silos; (3) executing, on each data silo, a machine learning algorithm using the data elements and the data identifiers on the data silo to derive a silo specific rule set; (4) calculating, on each data silo, a quality control metric on the silo specific rule set; (5) sending the quality control metric from each data silo to the computer; and (5) combining, on the computer, the quality control metrics from each data silo into a combined quality control metric.

In some embodiments, the quality control metric is an F-Score. The combined quality control metric could use a weighted algorithm. The data silos could be made up of a special purpose processor and a special purpose storage facility.

In some embodiments, the method also includes sending the silo specific rule sets to the computer from at least one of the plurality of data silos. And the method could further include sending a plurality of silo specific rule sets and quality control metrics associated with the silo specific rule sets, from the data silos to the computer. Yet in other embodiments, the silo specific rule sets are not returned to the computer. In some cases, a set of training results are sent with the identifiers to the plurality of data silos from the computer. The machine learning algorithm could create a test rule by adding a condition, calculating a test quality metric, and saving the test rule and test quality metric if the quality metric is better than previously saved test quality metrics. In some cases, the condition could be a range locating clusters of data.

A distributed system for creating a machine learning rule set is also described herein. The system is made up of a computer, a network, and a plurality of data silos. The computer executes software to prepare a set of data identifiers to identify data elements in a plurality of data silos. The network connected to the computer and the data silos and sends data between them. The plurality of data silos each independently execute machine learning software to create a silo specific rule set based on the data identifiers and silo specific data elements, and calculate silo specific quality control metrics for the silo specific rule set, and the data silos return the silo specific quality control metrics to the computer. The computer executes software to combine the quality control metrics from each data silo into a combined quality control metric.

Figure 11:
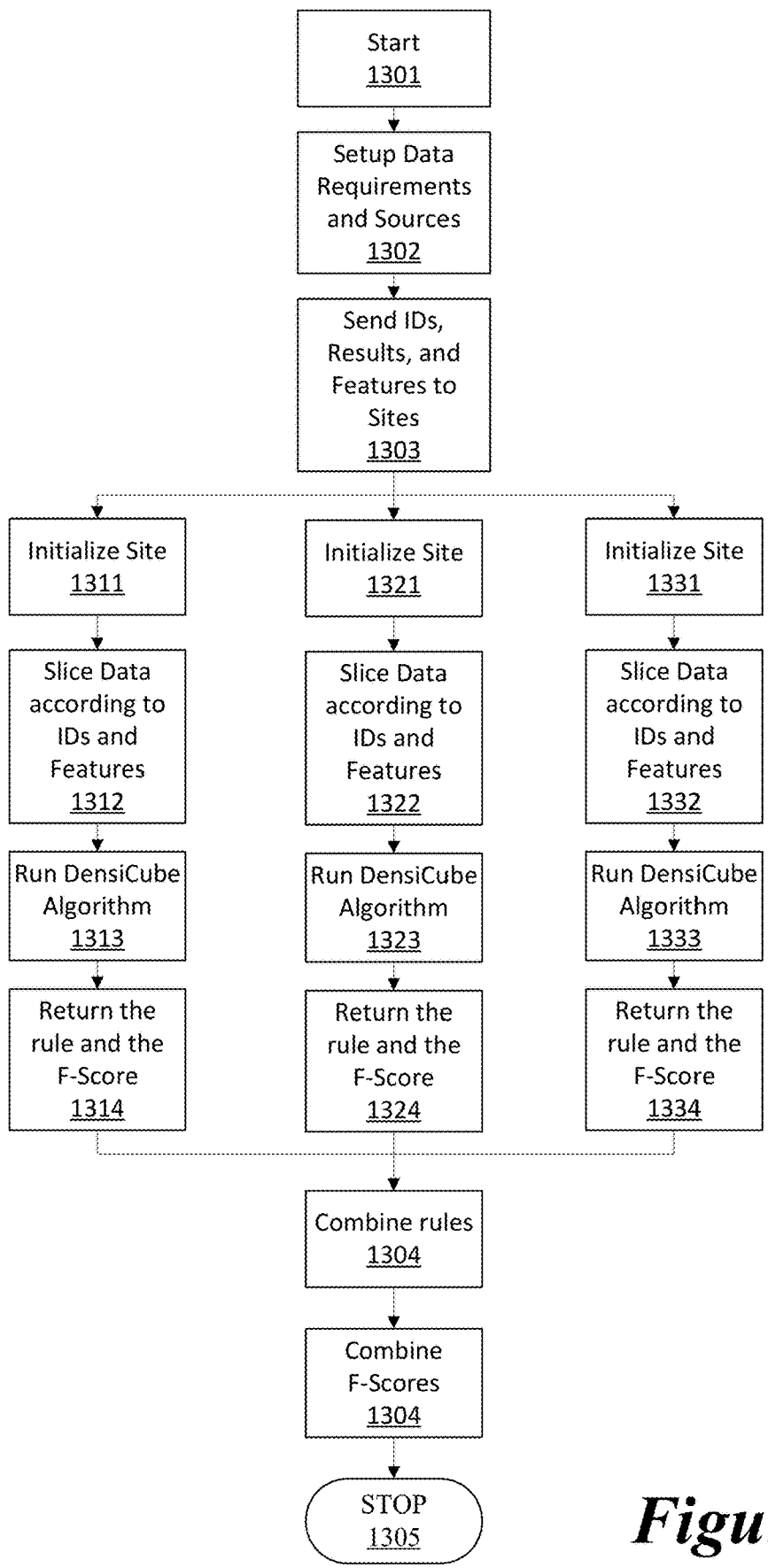
FIG. 11 is a flowchart showing the distributed nature of the Distributed DensiCube algorithm.

Looking to FIG. 11, we see the distributed nature of the Distributed DensiCube algorithm. The algorithm starts 1301 by initializing the software. The data requirements are setup, and the distributed sources of the data are identified 1302. Once the data features have been identified, a list of the IDs, the learning results (e.g. the Loan Results), and the perhaps the desired features (e.g. Amount Borrowed, Credit Score and Total Debt, Home Ownership and Home Value) are sent 1303 to the data silos. In some embodiments, the desired features are not sent, instead, the feature manager on the data silo determines the features. While some embodiments in U.S. patent application Ser. No. 16/355,985 have tri-state results (+, −, and blank), some embodiments only use a two state results set ("+" or blank). In the two state embodiment, there is no need to transmit the learning results; instead only a list of IDs is sent, with the implication that the IDs specified are the set of positive results.

The feature managers on each of the data silos then initialize the site 1311, 1321, 1331. The data on the silo is then sliced, using the list of IDs and the features 1312, 1322, 1332 into a data set of interest, by the feature data manager. The DensiCube algorithm 1313, 1323, 1333 is then run by the feature model manager on the data of interest. Once the DensiCube algorithm 1313, 1323, 1333 is complete, the rule and the F-score are finalized by the feature prediction managers, the rule and F-Scores are returned 1314, 1324, 1334 to the prediction orchestrator. In some embodiments, only the F-Scores are returned 1314, 1324, 1334, and the rules are maintained locally in the feature managers.

Figure 10:
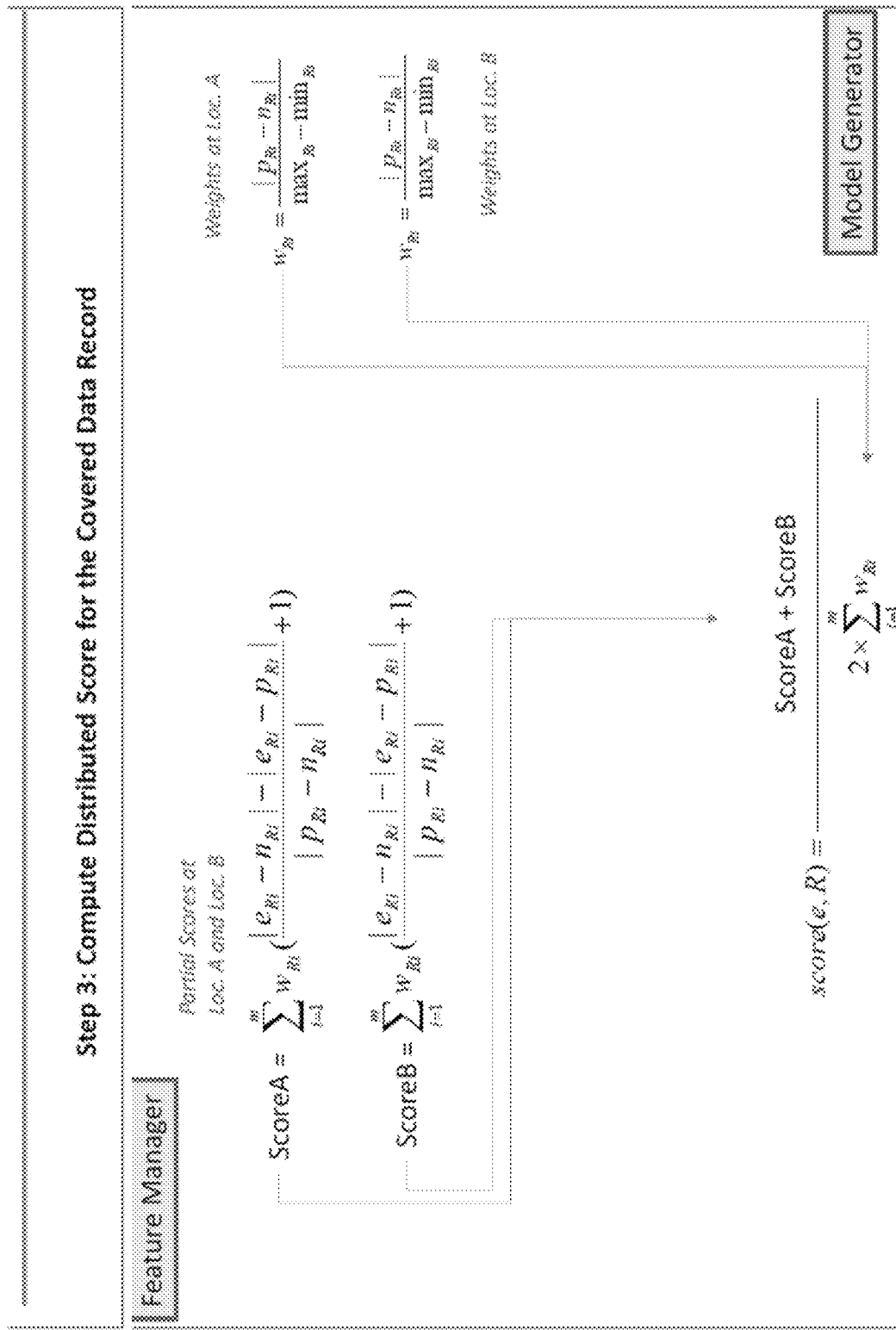
FIG. 10 shows modifications to the scoring algorithm to support privacy preserving in the data silos.

The rules, in some embodiments, are then returned to the prediction orchestrator where they are combined into an overall rule 1304. Next, the F-Scores are combined 1304 by the prediction orchestrator into an overall F-Score for the generated rule using the formulas in FIG. 10. And the Distributed DensiCube algorithm is complete 1305.

Once the machine learning algorithms are created 613, 623, 633, 643, the machine learning engines are stored 614, 624, 634, 644 (the machine learning engine contains the formula or algorithm created through machine learning process). Once the machine learnings are created and stored, the machine learning engines are returned 602.

Figure 7:
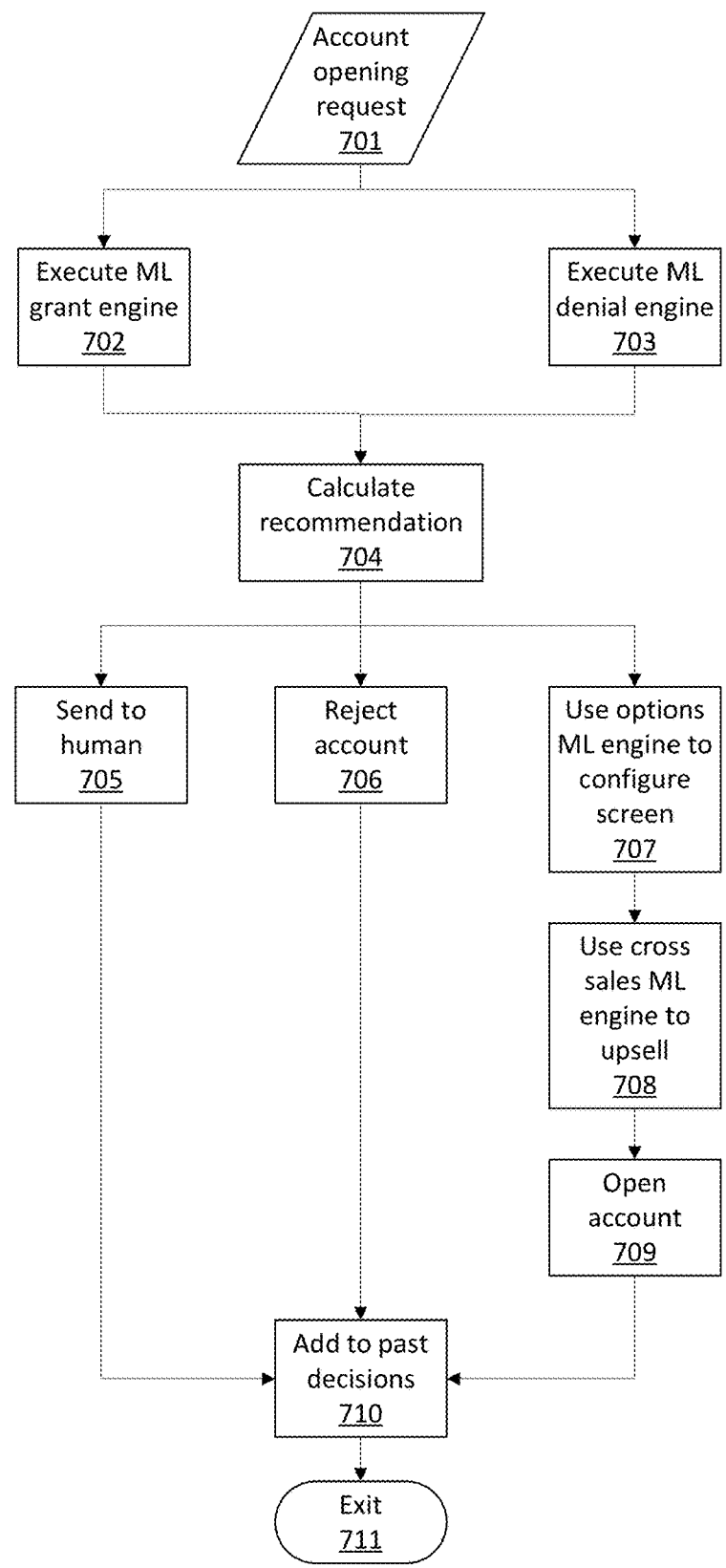
FIG. 7 is a flow chart of one embodiment of the account opening process.

In FIG. 7, the account opening process is seen. This process uses the machine learning rules engines created 613, 623, 633, 643 in FIG. 6. A customer (or bank employee in conjunction with the customer) initiates the bank accounting opening process with a request to open an account 701. The customer data is sent to the two machine learning rules engines, one for analyzing the data against rules (generated in 623) for granting an opening request 702 and one that analyses the customer data against the rules (generated in 613) for denying an opening request 703. The account could be a checking account, a savings account, a credit card account, a loan account, a revolving credit account, a small business credit account, a money market account, a certificate of deposit, an individual retirement account, a brokerage account, a bond account, etc.

A grant rules engine result for opening an account is sent from the machine learning grant rules engine 702 and a denial rules engine result is sent from the machine learning denial rules engine 703 to the recommendation calculation 704. The recommendation 704 is mathematically calculated based on the received likelihood of grant from the grant rules engine 702 and the received likelihood of denial from the denial rules engine 703. In some embodiments, this mathematical calculation is an average of the grant rules engine result and one minus the denial rules engine result. The recommendation circuitry 704 outputs the recommendation for granting or denying the received account opening request to one of three paths 705, 706, 707, depending on the value of the output.

If the output is below a threshold for denying the account opening, then the account is rejected 706. In some embodiments, the decision to reject is added to the database of past decisions 710, and the routine is exited 711.

In some embodiments, if the output is above the threshold for denying the account opening but below the threshold for approving the account opening, the account opening data is sent to a human 705 to make the final decision on the account opening. Whatever the human's decision is, it is added to the database of past decisions 710 for use in tuning the machine learning engine. Then the routine exits 711.

If the output is above the threshold for account approval, the account opening is approved. The account opening data is sent to the machine learning options rules engine 707 to determine which options the customer is most likely to use. These options are then positioned on the top of the customized screen, with the most likely options ordered at the top of the customized screen, and the customer is prompted for the desired options. For example, a customer has opened a Simple Checking account, and the machine learning options engine has determined that the customer is likely request the mobile banking option, so that option is displayed at the top of the list with mobile banking checked.

Figure 9:
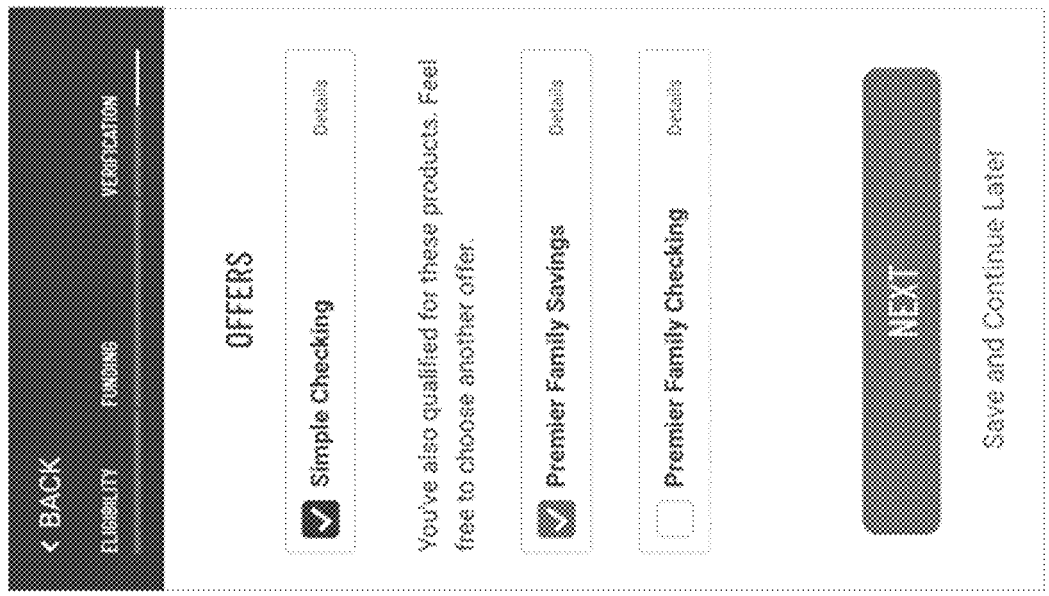
FIG. 9 is a screen shot of customized offers based on a machine learning analysis of the information used in opening the account.

Next, the machine learning cross sales rules engine 708 is run to determine which other bank products may be of interest to the customer (see FIG. 9). In this example, a customer has opened a Simple Checking account, and the machine learning cross sales rules engine 708 has determined that the customer is likely to also open a Premier Family Savings account. So this product is next on the screen, with the product checked.

Once the options are selected and various products are offered for sale, the account is opened 709. In some embodiments, the data related to this account opening is added to the database of past decisions 710, and the routine is exited 711.

It should be appreciated that many of the elements discussed in this specification may be implemented in a hardware circuit(s), a processor executing software code or instructions which are encoded within computer readable media accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method for automatically opening an account through a received account opening request using machine learning performed on circuitry, the method comprising:
creating a plurality of machine learning rules engines, using the circuitry, by accessing past decisions made regarding past account opening requests stored as past account opening records in a distributed memory comprising non-transitory computer readable media, with subsets of the past account opening records stored on different servers,
the plurality of machine learning rules engines created by executing a distributed machine learning algorithm on each subset of the past account opening records,
where each distributed machine learning algorithm creates a a quality control measure comprising an F-score that is combined with the F-Scores from each of the distributed machine learning algorithm to determine an optimal set of machine learning rules for the plurality of machine learning rules engines that are generated by ranking the F-score for each rule and selecting rules with a highest F-score as compared to other F-scores,
wherein the F-score is calculated based on a precision value comprising a number of correct results divided by a number of all returned results and a recall value comprising a number of correct results divided by a number of results that should have been returned,
wherein the plurality of machine learning rules engines include a grant rules engine and an options rules engine,
wherein the past account opening records each include a result comprising a grant or denial of the past account opening requests associated with the past account opening records, past options selected and other products purchased associated with the past account opening records, and
properties of the past account opening requests associated with the past account opening records including a risk score determined for the past account opening requests associated with the past account opening records,
wherein the past account opening records used to create the grant rules engine include only granted account opening records;
receiving, with the circuitry, the received account opening request,
determining a recommendation, using the circuitry, for granting or denying the received account opening request,
wherein the determination comprises executing the grant rules engine on the properties of the received account opening request using the circuitry, thus creating a grant rules engine result;
prompting a user, using the circuitry, for new options using a first customized screen generated by the options rules engine where the options rules engine determines a first selection and a first order of options on the first customized screen, and
granting or denying the received account opening request, using the circuitry, based on the grant rules engine result compared to a predetermined grant threshold.

2. The method of claim 1, wherein the plurality of machine learning rules engines also includes a denial rules engine.

3. The method of claim 2, wherein the determining of the recommendation also comprises executing the denial rules engine on the properties of the received account opening request using the circuitry, thus creating a denial rules engine result, wherein the past account opening records used to create the denial rules engine include only denied account opening records.

4. The method of claim 3, wherein the determining of the recommendation further comprises mathematically combining the grant rules engine result with the denial rules engine result.

5. The method of claim 4, wherein the granting or denying of the received account opening request is based on a comparison of the mathematical combination of the grant rules engine result with the denial rules engine result with a threshold.

6. The method of claim 1, wherein the granting or denying of the received account opening request is based on a comparison of the grant rules engine result with a threshold.

7. The method of claim 1, wherein the plurality of machine learning rules engines also includes a cross sales rules engine.

8. The method of claim 7, further comprising prompting the user, using the circuitry, for additional products using a second customized screen generated by the cross sales rules engine where the cross sales rules engine determines a second selection and a second order of cross sales products on the second customized screen.

9. The method of claim 1, wherein the distributed machine learning algorithm is a Densicube algorithm.

10. The method of claim 1, wherein the distributed machine learning algorithm is a KMeans algorithm.

11. The method of claim 1, wherein the distributed machine learning algorithm is a Random Forest algorithm.

12. The method of claim 1, wherein the plurality of machine learning rules engines are created in parallel.

13. The method of claim 1, wherein the account is a checking account.

14. The method of claim 1, wherein the account is a loan account.

15. A computing device for automatically opening an account through a received account opening request using machine learning, the computing device including:
distributed memory comprising non-transitory computer readable media, wherein the distributed memory stores past decisions made regarding past account opening requests as past account opening records, with subsets of the past account opening records stored on different servers, the past account opening records each include a result comprising grant or denial of the past account opening requests associated with the past account opening records, past options selected and other products purchased associated with the past account opening records, and past properties of the past account opening requests associated with the past account opening records including risk scores determined for the past account opening requests associated with the past account opening records;

the distributed memory also stores a plurality of machine learning rules engines, the plurality of machine learning rules engines created by executing a distributed machine learning algorithm on each subset of the past account opening records, where each distributed machine learning algorithm creates an F-Score that is combined with the F-Scores from each of the distributed machine learning algorithms to determine the plurality of machine learning rules engines, wherein the plurality of machine learning rules engines include a grant rules engine and an options rules engine, wherein the past account opening records used to create the grant rules engine include only granted account opening records;

the distributed memory also stores the received account opening request which includes received properties, the received properties including a risk score for the received account opening request; and circuitry configured to:
  receive the received account opening request;
  determine a recommendation for granting or denying the received account opening request, wherein the determination comprises execution of the grant rules engine on the received properties of the received account opening request, the execution creating a grant rules engine result;
  prompt a user for received options using a customized screen generated by the options rules engine where the options rules engine determines a selection and an order of the options on the customized screen; and
  automatically grant or deny the received account opening request based on the grant rules engine result compared to a predetermined grant threshold.

16. The computing device of claim 15, wherein the risk score is received from a system configured to output a risk of fraud based on data included in the received account opening request.

17. The computing device of claim 15, wherein the received account opening request being reviewed includes missing data, inaccurate data, or an inconclusive risk score.

18. The computing device of claim 15, wherein the received account opening request comprises at least one of a request to open the account at a financial institution or to add a service to the account.

19. The computing device of claim 15, wherein the past properties of the past account opening records and the received properties of the received account opening request include at least one of a credit score, credit history, an annual income, occupation, debit tools, history of non-payment of accounts, past bankruptcy, investment portfolio, savings amount, or investment amount.

20. The computing device of claim 15, wherein the account is a credit card account.

* * * * *

UNITED STATES PATENT AND TRADEMARK OFFICE
CERTIFICATE OF CORRECTION

| | | |
|---|---|---|
| PATENT NO. | : 11,003,999 B1 | Page 1 of 1 |
| APPLICATION NO. | : 16/507735 | |
| DATED | : May 11, 2021 | |
| INVENTOR(S) | : Leonardo Gil, Peter Cousins and Alexy Skosyrskiy | |

It is certified that error appears in the above-identified patent and that said Letters Patent is hereby corrected as shown below:

In the Specification

At Column 9 Line 13, should read: "In a typical".

In the Claims

At Column 19 Line 35, Claim 1, should read: "a quality control measure".

At Column 19 Line 45, Claim 1, should read: "comprising the number of correct results".

At Column 21 Lines 7-21, Claim 15, should read: "the distributed memory also stores a plurality of machine learning rules engines, the plurality of machine learning rules engines created by executing a distributed machine learning algorithm on each subset of the past account opening records, where each distributed machine learning algorithm creates a quality control measure comprising an F-Score that is combined with the F-Scores from each of the distributed machine learning algorithms to determine an optimal set of machine learning rules for the plurality of machine learning rules engines that are generated by ranking the F-score for each rule and selecting rules with a highest F-score as compared to other F-scores, wherein the F-score is calculated based on a precision value comprising a number of correct results divided by a number of all returned results and a recall value comprising the number of correct results divided by a number of results that should have been returned, wherein the plurality of machine learning rules engines include a grant rules engine and an options rules engine, wherein the past account opening records used to create the grant rules engine include only granted account opening records;".

Signed and Sealed this
Eighth Day of June, 2021

Drew Hirshfeld
*Performing the Functions and Duties of the
Under Secretary of Commerce for Intellectual Property and
Director of the United States Patent and Trademark Office*